United States Patent
Callaghan

(10) Patent No.: US 7,756,966 B2
(45) Date of Patent: Jul. 13, 2010

(54) DYNAMIC BROWSER-BASED INDUSTRIAL AUTOMATION INTERFACE SYSTEM AND METHOD

(75) Inventor: David M. Callaghan, Concord, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 15 days.

(21) Appl. No.: 12/355,585

(22) Filed: Jan. 16, 2009

(65) Prior Publication Data

US 2009/0138587 A1 May 28, 2009

Related U.S. Application Data

(63) Continuation of application No. 10/714,231, filed on Nov. 14, 2003, now Pat. No. 7,480,709.

(51) Int. Cl.
*G06F 15/173* (2006.01)
(52) U.S. Cl. .................. 709/223; 709/224; 709/203; 709/204; 709/205; 709/231; 345/473; 700/87; 700/17; 700/83; 700/86; 700/88
(58) Field of Classification Search .................. 709/223, 709/224, 203–205, 217–219, 231
See application file for complete search history.

(56) References Cited

U.S. PATENT DOCUMENTS

| | | | |
|---|---|---|---|
| 5,838,906 A | 11/1998 | Doyle et al. | |
| 6,332,127 B1 | 12/2001 | Bandera et al. | |
| 6,539,271 B2 | 3/2003 | Lech et al. | |
| 6,631,403 B1 | 10/2003 | Deutsch et al. | |
| 6,640,169 B2 | 10/2003 | Bergmann et al. | |
| 6,771,290 B1 | 8/2004 | Hoyle | |
| 6,901,439 B1 | 5/2005 | Bonasia et al. | |

(Continued)

FOREIGN PATENT DOCUMENTS

DE 298 23 119 U1 2/1999

(Continued)

OTHER PUBLICATIONS

Guldman. Building Rich Internet Applications with Macromedia Flash MX and ColdFusion MS, Fluid, Inc., Apr. 2002.

(Continued)

*Primary Examiner*—Jude J Jean Gilles
(74) *Attorney, Agent, or Firm*—Turocy & Watson LLP; R. Scott Speroff; John M. Miller

(57) ABSTRACT

An automation device interactive user interface and method of using the interface is provided herein. The interface is network based in that it employs a browser enhanced by an interactive program embedded therein and an execution engine to execute the program. The interface can be proximate to an associated automated device(s) or remotely connected thereto using a local area network (LAN) and/or a wide area network (WAN) such as the Internet. To facilitate ease of use, the embedded interactive program presents information in an appealing multimedia fashion such that interface appears live and changing. Furthermore, data associated with automation devices can be monitored, extracted, transmitted or otherwise manipulated in real time.

20 Claims, 12 Drawing Sheets

U.S. PATENT DOCUMENTS

| | | | |
|---|---|---|---|
| 7,225,426 B2 * | 5/2007 | Frank et al. | 717/108 |
| 2002/0095644 A1 | 7/2002 | Weiss | |
| 2002/0107701 A1 | 8/2002 | Batty et al. | |
| 2002/0143886 A1 * | 10/2002 | Camens | 709/208 |
| 2002/0184373 A1 | 12/2002 | Maes | |
| 2004/0032424 A1 * | 2/2004 | Florschuetz | 345/748 |
| 2004/0215740 A1 * | 10/2004 | Frank et al. | 709/217 |

FOREIGN PATENT DOCUMENTS

| | | |
|---|---|---|
| WO | 98/50834 A1 | 11/1998 |
| WO | 03/079126 A1 | 9/2003 |

OTHER PUBLICATIONS

EP Search Report dated Oct. 20, 2009 for European Application No. EP 04 02 5301, 3 pages.

* cited by examiner

DYNAMIC BROWSER-BASED INDUSTRIAL AUTOMATION INTERFACE SYSTEM AND METHOD

CROSS-REFERENCE TO RELATED APPLICATIONS

This application is a continuation of U.S. patent application Ser. No. 10/714,231, filed Nov. 14, 2003, entitled "DYNAMIC BROSWER-BASED INDUSTRIAL AUTOMATION INTERFACE SYSTEM AND METHOD", the entirety of which is hereby incorporated by reference.

TECHNICAL FIELD

The present invention relates generally to industrial automation, and more particularly toward a system and method for communicating with automation devices utilizing an animated and interactive human/machine interface (HMI).

BACKGROUND

Human/machine interfaces (HMIs) or simply user interfaces are important to the successful operation and maintenance of industrial automation devices and equipment. User interfaces provide the essential communication link between operators and automation devices. This link allows operators to, among other things, setup devices, monitor device status during operation, as well as analyze device health. Without such user interfaces, high level industrial automation would be difficult if not impossible to achieve.

Over the years, user interfaces have gone through several changes. At first, user interfaces were simply dumb terminals, which merely displayed text messages to end-users indicative of some process performed by a server or processor associated with an automated device. For instance, a failed device would generate an internal error code representing a determined error which could then be matched to a particular error message and displayed to a user or operator on a display device. Over time, client side processing developed so as to enable a move from a text based interface to a graphical user interface (GUI). This transition shifted some of the processing burden away from the automated device or associated processor toward the client side GUI. These new GUIs vastly improved the ability of users to access information quickly and easily. Unfortunately, these GUIs were not portable in part because of there size and machine dependencies and therefore not a viable option for managing and controlling a plurality of network connected devices. Shortly thereafter, the processing burden shifted back toward devices and away from interfaces with the advent the Internet and web browsers. As a result, developers sought to use web browsers as an interface mechanism. However, browsers merely employ a mark up language that is useful for displaying text and static images over a network (as was the purpose of browsers when they were conceived), but not for dynamic user interfaces. Accordingly there is a need in the art for a browser-based interface that provides users with a rich interactive experience that allows users to quickly and easily access and transfer information to and from automation devices in real-time.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Disclosed herein is a system and method for interacting with automation devices or machines. Automation devices are communicatively coupled with other components and devices such as a data store for centrally storing device data via a network. A user can then communicate proximately or remotely with the automation devices and other associated networked components and devices via a rich, responsive and engaging browser-based interface in order to easily monitor, extract, and/or transmit data to and from automation devices in real time. Such an interface is made possible by extending browser functionality by embedding or incorporating an interactive program and an associated execution engine. The interactive program can comprise, among other things, bindings and a presentation component. Bindings can be specified which bind interactive program variables to automation device data such that the displayed data can be updated in real time and therefore always remain current. The presentation component can then be employed to specify an interactive multimedia context to display and interact with device data. Accordingly, the present invention provides for sophisticated and real time interaction with device data by employing a rich and easy to use browser-based interface.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

The foregoing and other aspects of the invention will become apparent from the following detailed description and the appended drawings described in brief hereinafter.

DETAILED DESCRIPTION

The present invention is now described with reference to the annexed drawings, wherein like numerals refer to like elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope or spirit of the subject invention.

Figure 1A:
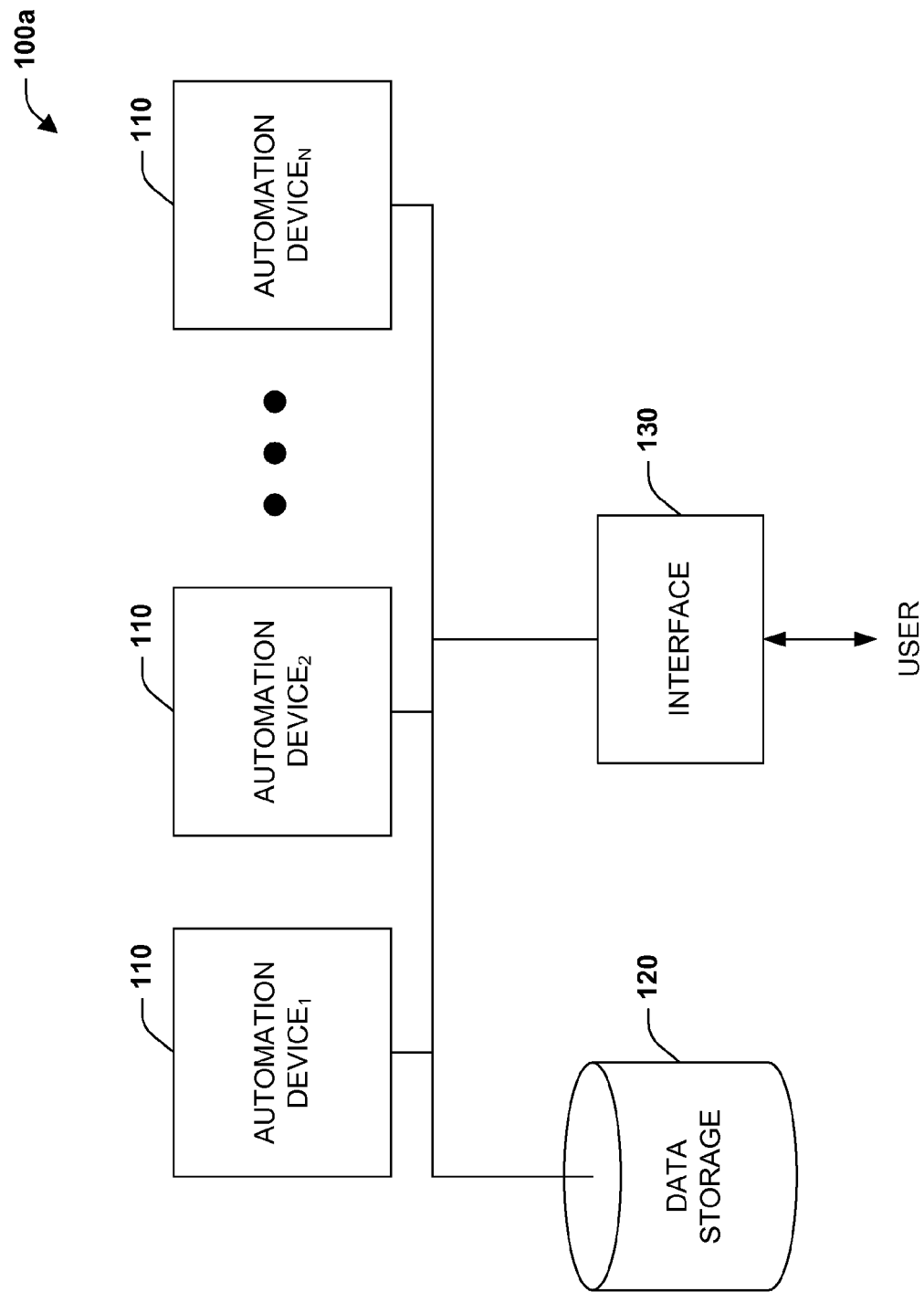
FIG. 1a is a block diagram of an industrial automation system in accordance with an aspect of the present invention.

Turning initially to FIG. 1a, an industrial automation system 100a is depicted in accordance with an aspect of the subject invention. System 100a comprises one or more automation device(s) 110 (AUTOMATION DEVICE$_1$ through AUTOMATION DEVICE$_N$, where N is an integer greater than or equal to one), data storage 120 and interface 130. Automation device(s) 110 can include any on of a plurality of industrial processes and machines such programmable logic controllers (PLCs), pumps providing fluid transport and other processes, fans, conveyor systems, compressors, gear boxes, motion control and detection devices, sensors, screw pumps, and mixers, as well as hydraulic and pneumatic machines driven by motors. Such motors can be combined with other components, such as valves, pumps, furnaces, heaters, chillers, conveyor rollers, fans, compressors, gearboxes, and the like, as well as with appropriate motor drives to form industrial machines and actuators. For example, an electric motor could be combined with a motor drive providing variable electrical power to the motor, as well as with a pump, whereby the motor rotates the pump shaft to create a controllable pumping system. Data storage 120 provides a central storage location for housing data relating to automation device(s) 110 including but not limited to device description, location, and mechanical condition, energy or fuel consumption, completed cycles, horsepower, average RPM, efficiency rating, as well as data from sensors regarding device health and/or performance. According to one aspect of the present invention data storage device 120 comprises a relational database and associated relational database management system as is known in the art (e.g., SQL). However, it should be noted that the subject invention is not so limited. For example, the data can be stored as XML (eXtensible Markup Language) documents or substantially any other format. Interface 130 is operable to connect users with a network of automation devices 110 and/or data storage 120 via a wire (e.g., twisted pair, coaxial cable, optical fiber, Ethernet, USB (Universal Serial Bus), FireWire) or wirelessly (e.g., using IEEE 802.11a and/or IEEE 802.11b standards, Bluetooth technology, satellite). Interface 130 facilitates monitoring, extracting, transmitting, and otherwise interacting with automated device(s) 110 and data associated therewith.

Figure 1B:
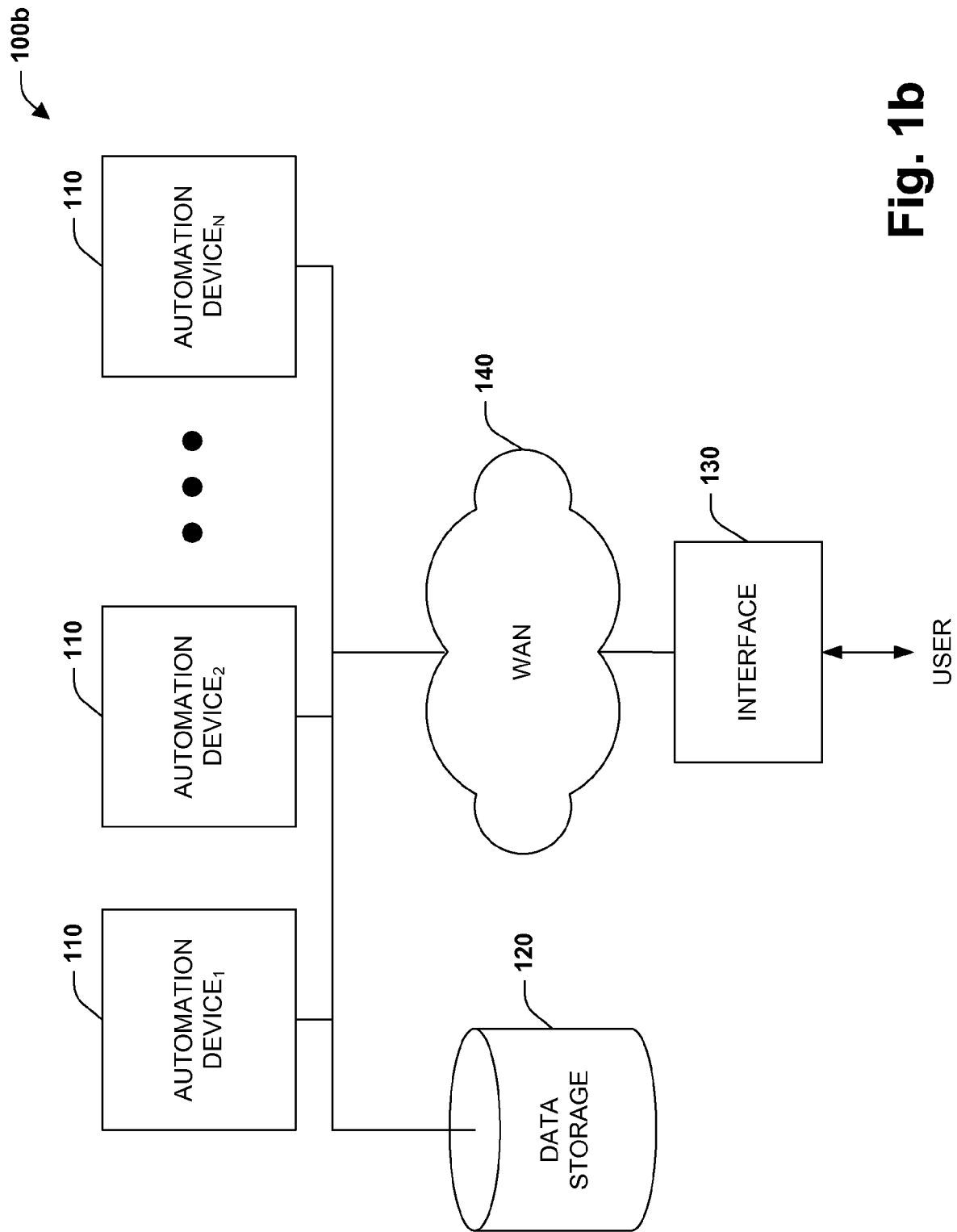
FIG. 1b is a block diagram of an industrial automation system in accordance with an aspect of the subject invention.

As is shown in FIG. 1a, a user such as an device operator can connect to data storage 120 and automation devices 110 over a local area network (LAN) utilizing a variety of LAN technologies, including Fiber Distributed Data Interface (FDDI), Copper Distributed Data Interface (CDDI), Ethernet/IEEE 802.3, Token Ring/IEEE 802.5, physical connection topologies such as bus, tree, ring, and star, and the like. However, communications between networked devices such as automation devices 110, data storage 120, and interface 130 need not be limited to those devices connected locally to a network. Local networked devices can also communicate to and from remote devices. Turning to FIG. 1b, system 110b is depicted which is substantially the same as system 100a except that a user employs interface 130 to interact with automation devices 110 and data storage 120 remotely over a wide area network (WAN) 140. WANs 140 are communication networks that span a large geographic area (e.g., nationwide, worldwide) and generally consist of the several interconnected local area networks (LANs) and metropolitan area networks (MANs). The largest known WAN 140 known today is the Internet. WAN technologies include, but are not limited to, point-to-point links, circuit switching networks like Integrated Services Digital Networks (ISDN) and variations thereon, packet switching networks, T1 networks, and Digital Subscriber Lines (DSL).

Figure 2:
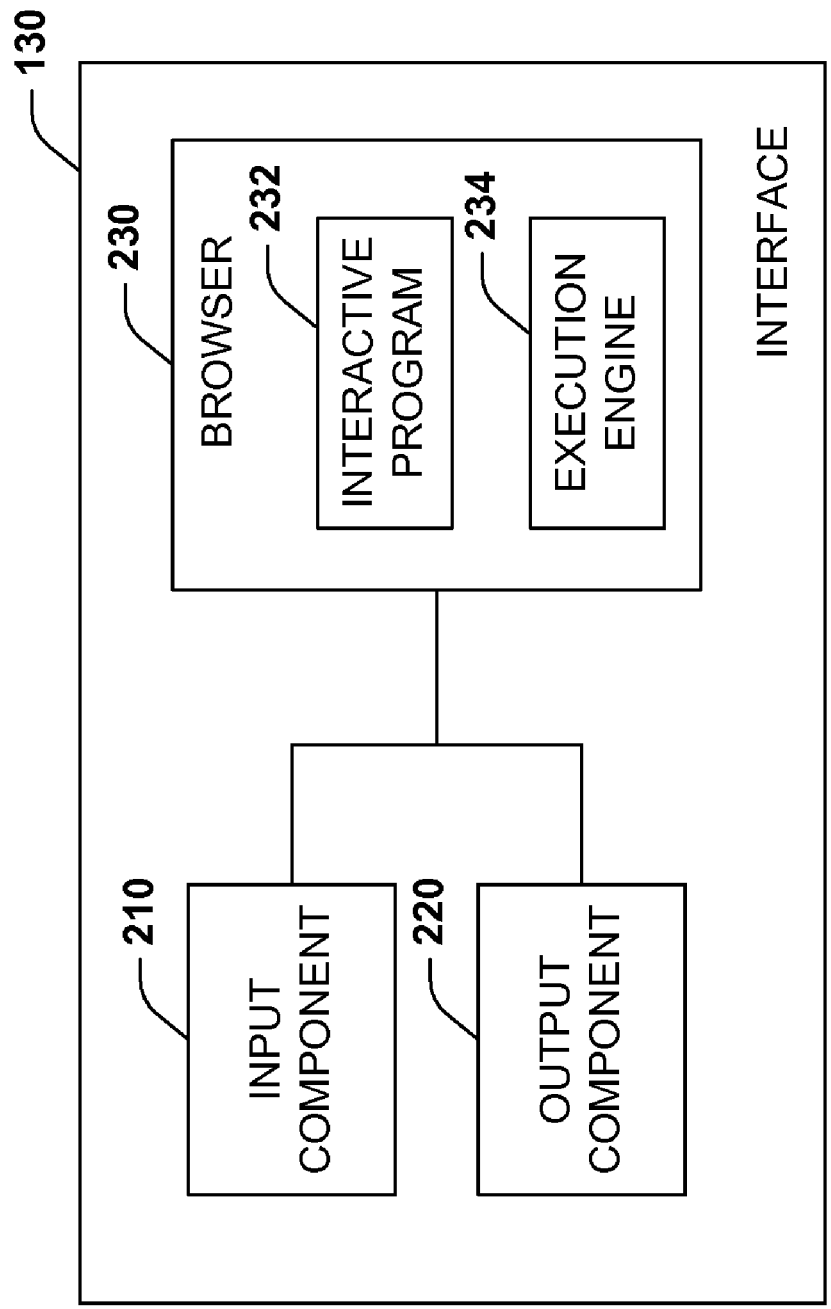
FIG. 2 is a schematic block diagram of an interface in accordance with an aspect of the present invention.

Attention is now directed to FIG. 2 where interface 130 is illustrated in further detail. Interface 130 includes an input component 210, an output component 220, a browser 230, an interactive program 232, and an execution engine 234. Input component 210 receives input from a user and from other sources such as automation device(s) 110, and centralized storage 120. Input received by the input component 210 from a user can come via a touch screen display, a keyboard, a mouse, a stylus, a voice recognition system and the like. Output component 220 provides data for display to a user (e.g., CRT, LCD . . . ) and can also be employed to write data to storage device 120 or issue commands or instructions to automation devices 110. Browser 230 corresponds to an application program used to facilitate viewing of network data (e.g., Internet Explorer®, Netscape Navigator®). Browser 230 comprises an interactive program 232 and an execution engine 234. Interactive program 232 can be designed to specify, inter alia, interface functionality and presentation format as described in further detail below. Interactive program 232 can then be embedded into browser 230 using HTML (Hyper Text Markup Language). For example:

```
<embed src = "DeviceInterface.ext"  Height="1000" Width="1200"
type="application type">
   </embed>
```

After an interactive program 232 is embedded into the browser it can be executed using execution engine 234. Execution engine 234 can be in the form of a plugin which can be downloaded and installed to extend browser functionality.

Figure 3:
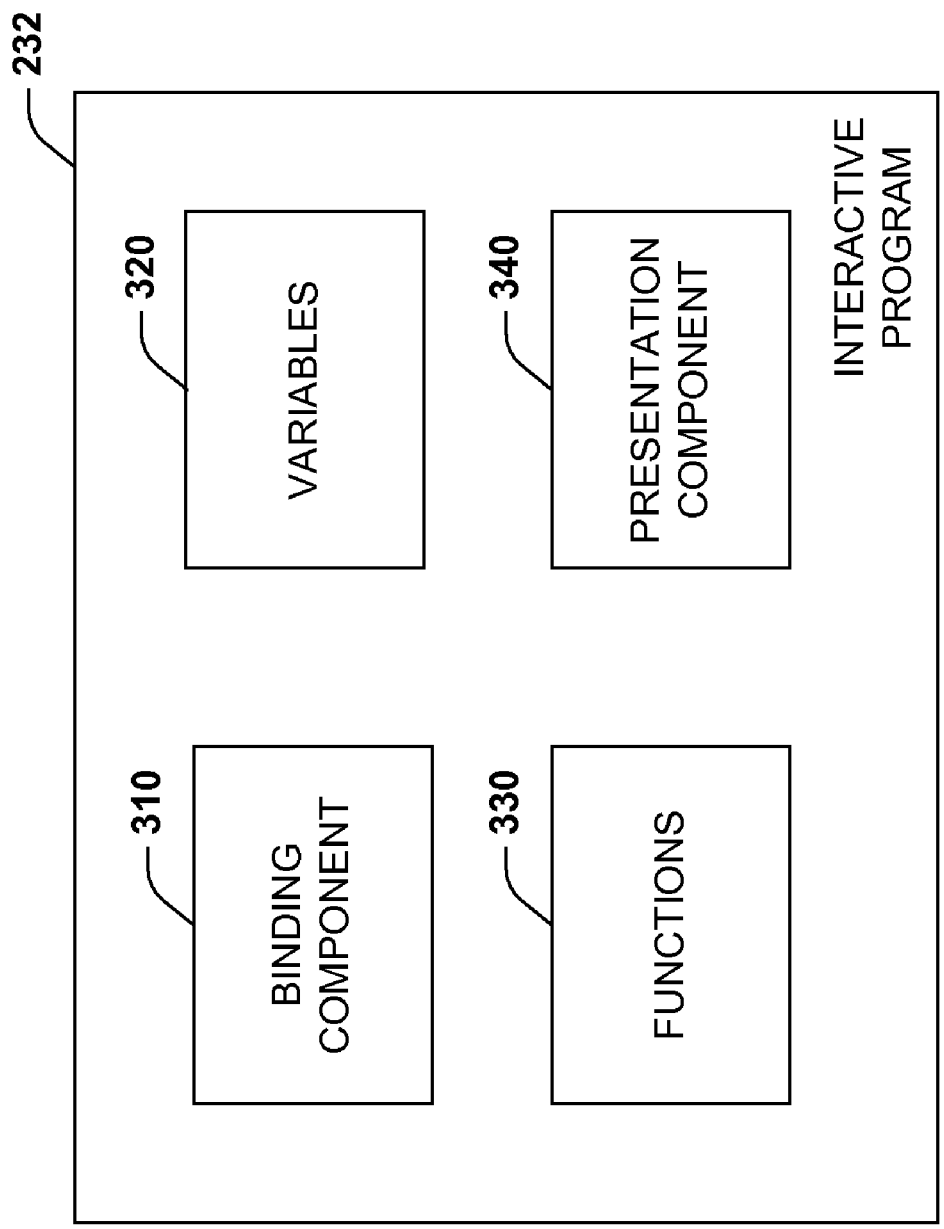
FIG. 3 is a block diagram illustrating an interactive program in accordance with an aspect of the subject invention.

FIG. 3 is a block diagram depicting an interactive program 232 in accordance with an aspect of the present invention. Program 232 can include among other things a binding component 310, variables 320, functions 330 and a presentation component 340. Binding component 310 can be employed to bind program variables to data from outside sources (e.g., data store 120). For instance, data corresponding to an automated device's temperature stored either in automated device memory or in centralized data storage 120 can be bound to a temperature variable 320 in the interactive program. Binding data in this manner enables real-time updates and display of changing data. Functions 330 can also be employed to manipulate received data to produce rich descriptions of automated device status, performance, and health as well as provide the means to create, update, monitor, transmit and extract data from a plurality of sources including but not limited to centralized storage 120 and automated device(s) 110. For example, functions 330 can be employed to monitor a device's temperature and power, compare those values to acceptable values (e.g., provided by a manufacturer via a web service or determined by the function itself), and produce an alert indicating the health status of a device (e.g., excellent, good, poor, dangerous . . . ). Furthermore, it should be appreciated that more complex functions can be executed outside the interactive program and tied therein for example by using binding component 310 to facilitate improved execution time and real-time display. For instance, complex device diagnostic/prognostic analysis utilizing artificial intelligence techniques such as Bayesian networks and the like can be executed by a server (not shown) associated with data store 120 (e.g., upon clicking a button in the interface), the result of such analysis being linked to one or more interactive program variables, which can then be used to display the result. Presentation component 340 can be utilized to specify the manner or format in which device data and other information will be presented, utilized, and otherwise interacted with by a user. Data can be presented in a multimedia fashion to improve the look of the display and the ease of use, for example by integrating, a plethora of colors, images, sounds, animated images, movies and the like. In addition, buttons, check boxes, slider bars, text boxes, hyperlinks and the like can be displayed and used as a mechanism to initiate specific functionality. For example, a button can be provided that when clicked on by a user (e.g., using a mouse) initiates the performance of maintenance on an automated device, or produces a graphical representation of system production. Still further yet, a presentation can be specified as an interactive map of a facility such that a user can point and click to start and stop devices, increase or decrease power, or view information about each device.

According to one aspect of the subject invention, Flash MX by Macromedia, Inc. can be utilized to provide a rich interactive interface for use with automation devices. Flash MX provides a system consisting of a group of software applications for producing interactive programs and a browser plugin (e.g., flash player, shockwave player) for executing such an interactive program from within a browser. Flash, as is known in the art, is widely utilized for developing Internet applications that incorporate full motion video and sound. Applying such technology to visualize live real-time automation data provides benefits not contemplated by the original developers of Flash.

Figure 4:
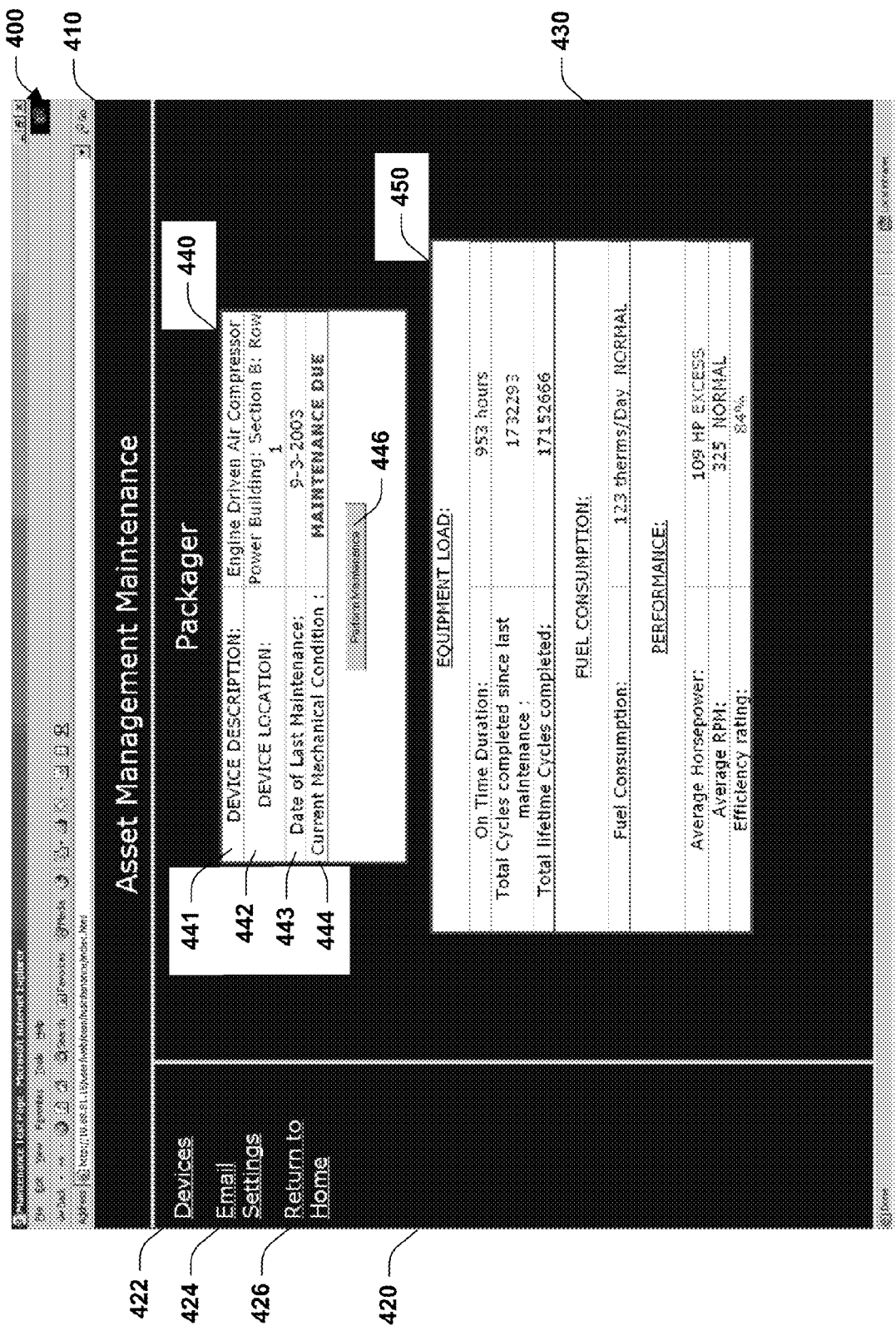
FIG. 4 is an illustration of an exemplary interface in accordance with an aspect of the present invention.

FIG. 4 illustrates an exemplary interface 400 in accordance with an aspect of the present invention. Exemplary interface 400 is an asset management maintenance interface. As is illustrated, the interface is divided into three frames or sections 410, 420, and 430. Frame 410 simply provides a section to display the title of the interface-Asset Management Maintenance. Frame 420 provides links 422, 424, and 426 to other web pages and functionality possibly for display in frame 430. Link 422 corresponds to a devices link which can be activated such that a list or map of system devices can be displayed in frame 430 for selection by a user. Link 424 provides a link to set up email such that a user will have easy access to email to notify others of information displayed in the interface or even copy screen shots. Return home link 426 provides an option to return to a homepage as the currently displayed page is at least one level deep in a hierarchy of interface pages. Frame 430 displays the main page selected, which corresponds here to a packager device. Frame 430 comprises two blocks 440 and 450 separating distinct portions of information about the packager device. Block 440 includes device description 441, device location 442, date of last maintenance 443 and current mechanical condition 444. As shown here, device description and device location simply display respective updatable data next to statically displayed text. However, the displayed text could also be links such that upon selection of a link the user is transported to another page of the interface which contains, for instance, more detailed information about the device or a map illustrating the actual location of the device relative to other devices. Also shown here in block 440 is the current mechanical condition of the packager device, which can be determined and displayed in real time, and a perform maintenance button 446. Perform maintenance button 446 provides the user the option and mechanism to initiate a maintenance process or program by simply clicking the button conveniently located below the listed mechanical condition—here Maintenance Due. Block 450 comprises three tables illustrating data with respect to equipment load, fuel consumption and performance. This data can be implemented such that the interactive program providing this display links, binds, or calculates the displayed data in real time. For example, during the time in which a user is perusing the display the data corresponding to the total lifetime cycles completed can be constantly updated as the device completes cycles. Accordingly, the user will always have the most current data available rather than merely a snapshot of the data at a particular time (e.g., when the browser is first opened by a user).

Figure 5:
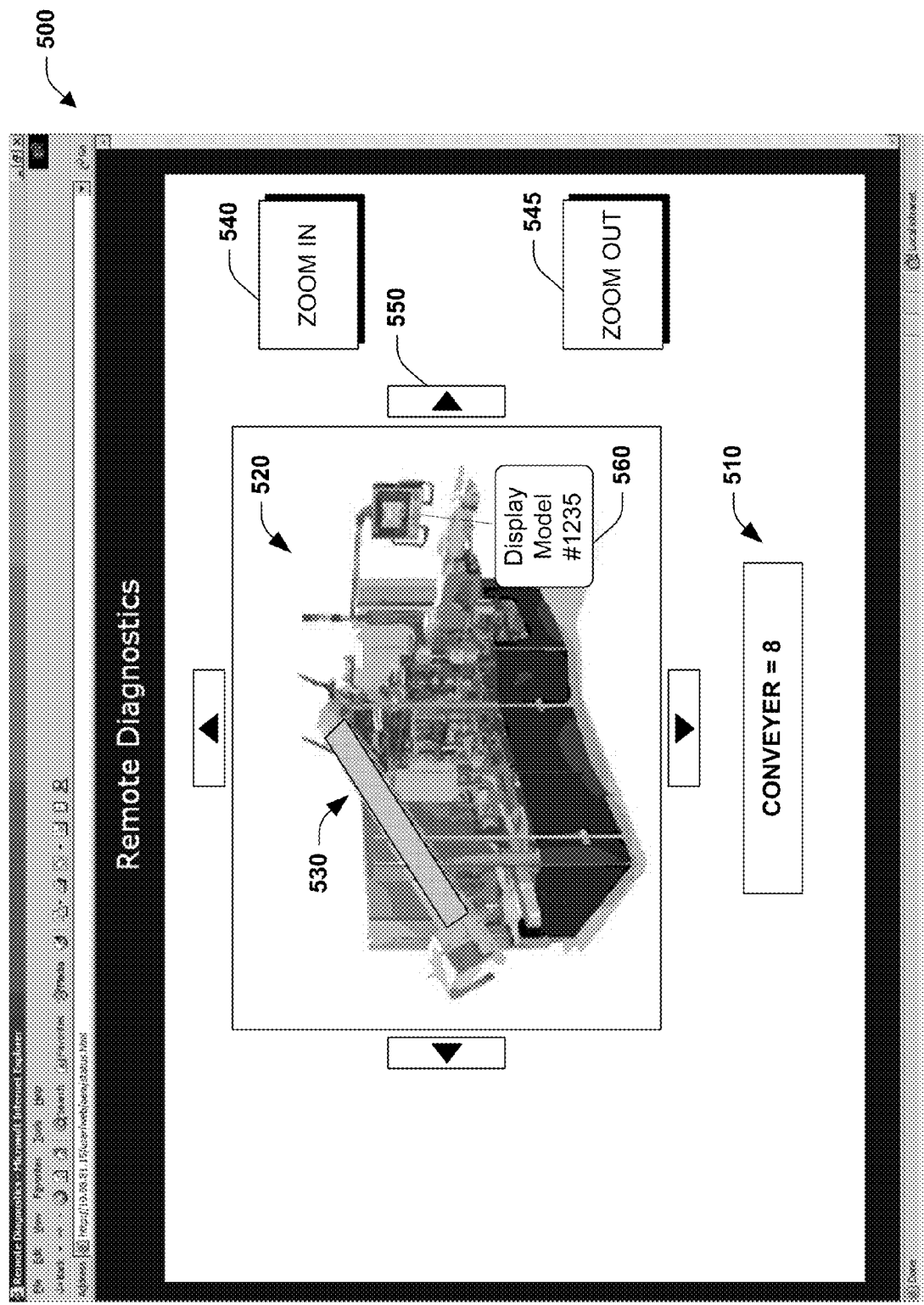
FIG. 5 is an illustration of another exemplary interface in accordance with an aspect of the present invention.

FIG. 5 illustrates an exemplary interface 500 in accordance with another aspect of the present invention. Interface 500 could result in response to the initiation of a diagnostic/prognostic procedure via a button, or command line prompt, for example. As shown, the diagnostic/prognostic procedure determined that there was a problem with the conveyer on a particular device. Accordingly, a text box 510 is displayed indicating that the problem concerns conveyer 8. Furthermore, the device 520 associated with conveyer 8 is displayed. Still further yet, the problem conveyer belt is highlighted 530 (e.g., color, hatching, flashing color, sound, or a combination thereof) so that a user can easily identify exactly where the problem lies. If multiple problems are found, multiple areas of the device can be highlighted and/or noted in a text box to indicate each problem area. As problems are resolved, highlighted and noted areas can be removed in real time to indicate to the user that a particular problem has been fixed. In addition, it should be appreciated that if the device image shown is rendered by an interactive program. Therefore, the image can be live and active. For example, by hovering a cursor over portions of the image additional information can be display such as a description of the part or more information about the cause of a problem. Furthermore, the image is interactive in that a user can zoom in and out on particular portions the image using mechanisms such as zoom in button 540, zoom out button 545, and positional arrows 550. According to an aspect of the invention, the execution engine 234 (e.g., flash plugin) provides such interactivity as specified in an interactive program 232. For instance, causing a cursor to hover over a portion of the image can cause the execution engine to request information (e.g. control data, model information . . . ) from a data source (e.g., web page, web service, data storage medium) so as to retrieve information and update the display for example with a text box or bubble 560 containing the retrieved information. Additionally it should be noted that a request by the execution engine can initiate other procedures. For instance, a request for information regarding the health of a motor in device 520 can cause the controller associated therewith to query the motor or initiate a diagnostic testing procedure. The results can then be provided in a file (e.g., XML file) for the execution engine to retrieve the particular requested information.

Figure 6:
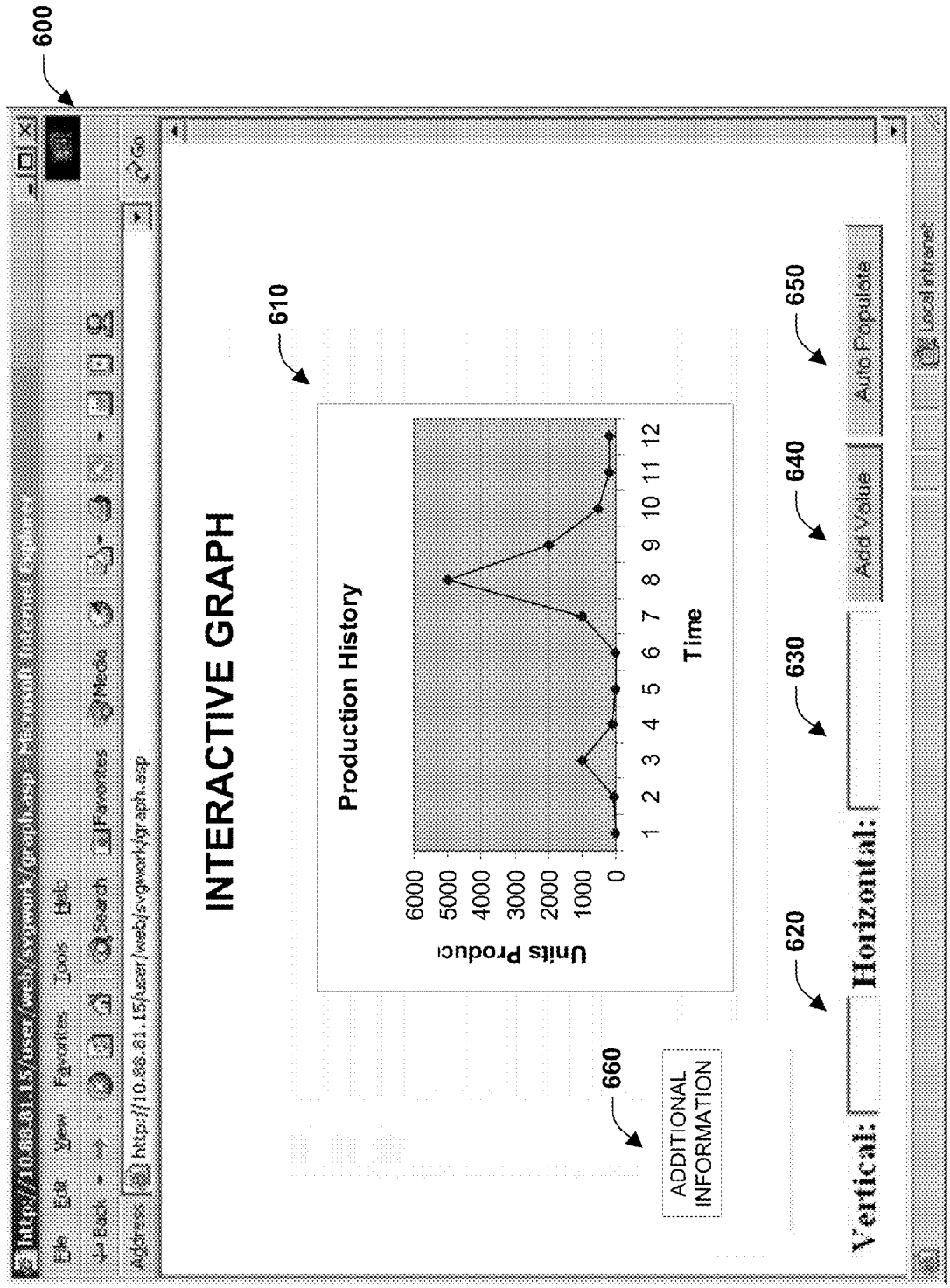
FIG. 6 depicts yet another exemplary interface in accordance with an aspect of the present invention.

FIG. 6 depicts yet another exemplary interface 600 in accordance with an aspect of the present invention. Interface 600 illustrates the interactivity of the present invention specifically with respect to graphs and charts. In particular, a user can produce a process history graph 610, for example, in real time from within a browser window 600. For instance, a Y axis (ordinate) can be utilized to indicate the number of units processed (e.g., 0-8291) and an X axis (abscissa) can be utilized to determine the number of units processed throughout a given period of time (e.g., hour, day, month, year). Vertical values 620 and horizontal values 630 can be automatically retrieved via the auto populate mechanism 650 (e.g., from data storage 120) or manually set by entering each value and activating the add value mechanism 640. Furthermore, the user interface 600 further comprises a mechanism 660 that provides a link to additional information (e.g., different type of graph-pie, bar . . . ).

Figure 7:
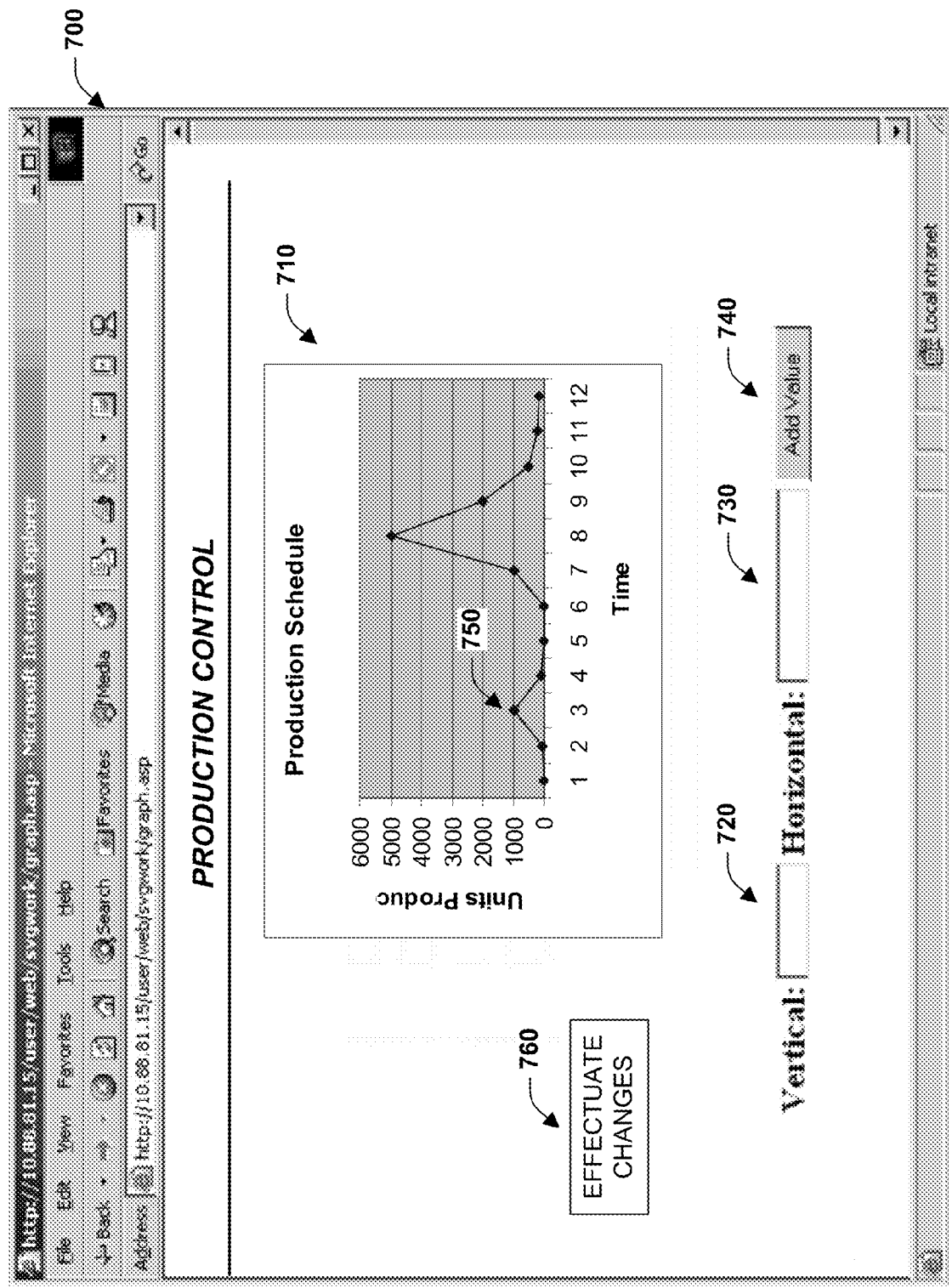
FIG. 7 depicts another exemplary interface to be employed to control a production schedule for particular automated devices in accordance with an aspect of the subjection invention.

Additionally it should be noted that a similar interface such as interface 700 of FIG. 7 could be employed to provide control, for instance, of a production schedule for particular automated devices. For example, an interactive graph 710 could be provided which controls the output of the machine (e.g., number of products produced). A user could modify the output of a machine by manually entering vertical production values corresponding to number of units to produce at 720 and horizontal time values corresponding, for example, to hours in a day at 730 and then activating mechanism 740 (e.g., by clicking on with a mouse). Additionally or alternatively, a use can click and drag (e.g., using a mouse, stylus . . . ) points 750 on the graph 710 to effectuate changes in a production schedule. The interface can subsequently initiate effectuation of such changes by interpreting the interactive graph 710, by clicking on button 760, for example.

Figure 8:
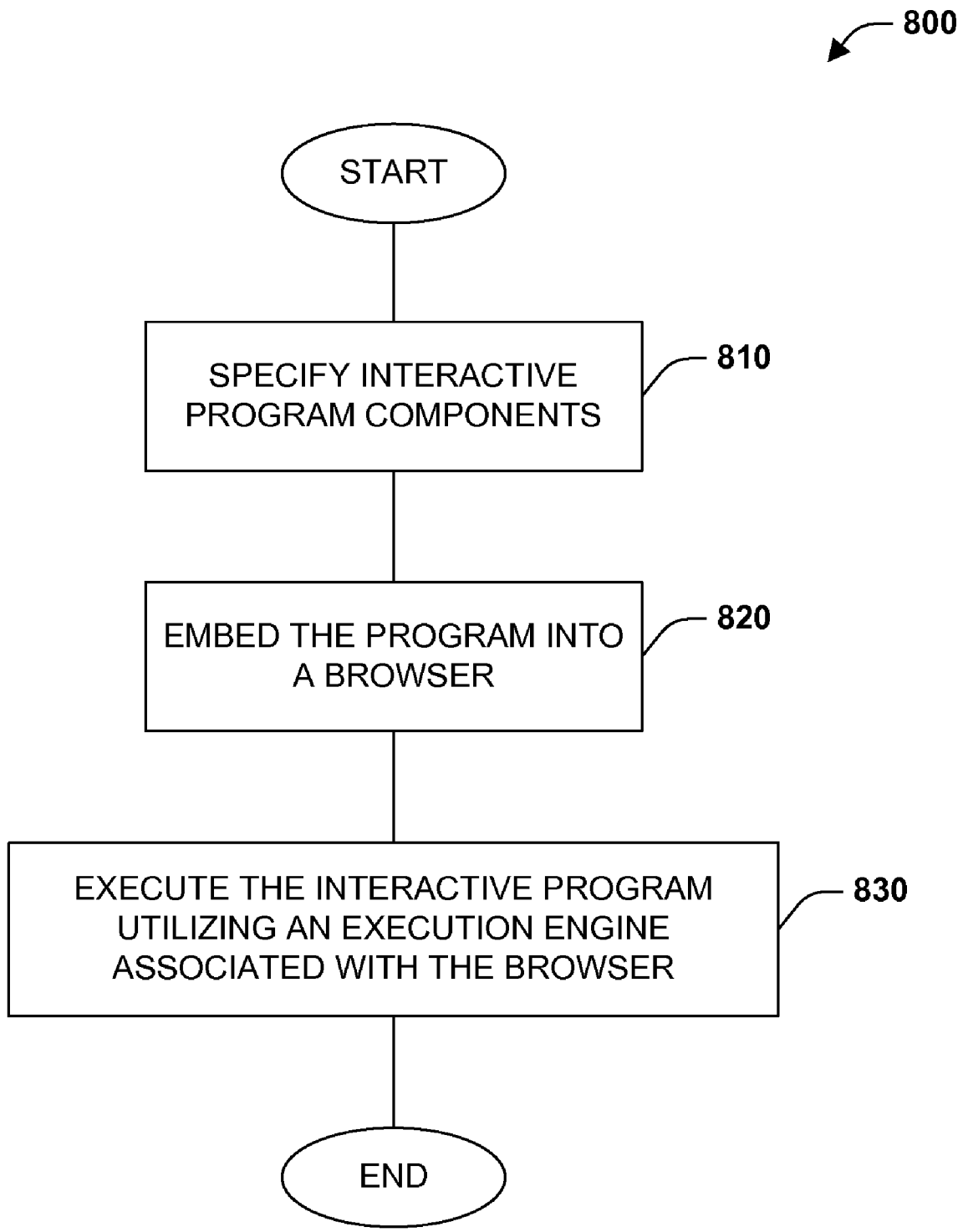
FIG. 8 is a flow chart diagram illustrating a methodology for interacting with automation device data in accordance with an aspect of the present invention.
Figure 9:
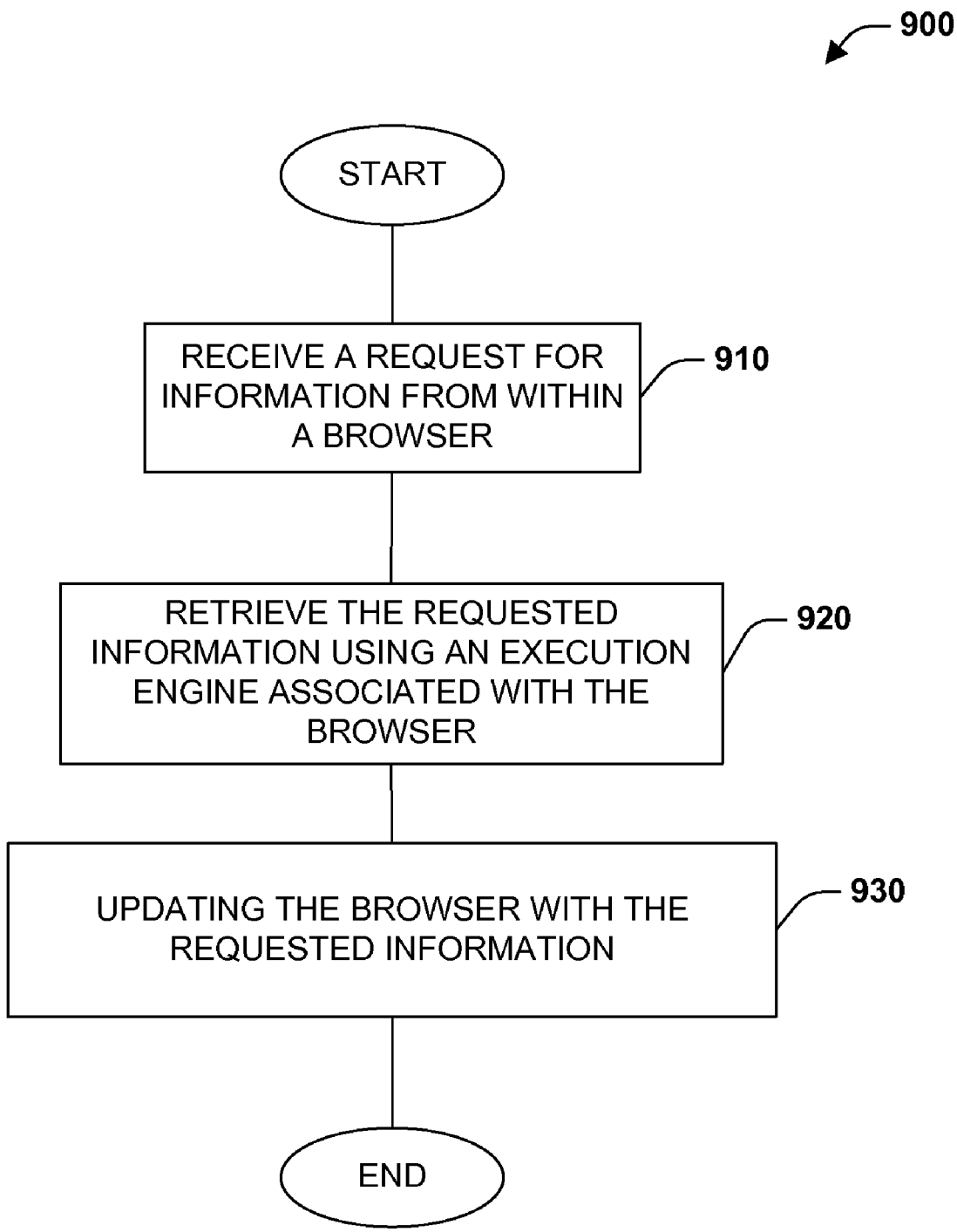
FIG. 9 is a flow chart diagram illustrating a methodology for interacting with automation device data in accordance with an aspect of the subject invention.

In view of the exemplary systems described supra, a methodology that may be implemented in accordance with the present invention will be better appreciated with reference to the flow charts of FIGS. 8 and 9. While for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Turning to FIG. 8, a methodology 800 for interacting with automation device data is illustrated in accordance with an aspect of the present invention. At 810, interactive program components are specified such as variables, bindings, functions, and presentation format. For example, device performance data such as average horsepower, average RPM, and efficiency rating can be bound to program variables of similar names and displayed in table format on a browser page such as in FIG. 4. At 820, the specified interactive program is embedded in a browser, for instance by including embed tags (e.g., <embed> . . . </embed>) and specifying appropriate parameters. Finally, at 830, the interactive program is executed by a browser in conjunction with an execution engine. The execution engine can be a plugin that is downloaded and installed to enhance the functionality of a browser. According to one aspect of the subject invention, the interactive program is a flash program which can be executed within a browser environment utilizing a flash player.

Turning attention to FIG. 9, a methodology 900 for interacting with automation device data is depicted. At 910, a request for information or data is received from within a browser. Such a request can be made be interacting with various mechanisms including but not limited to buttons and sliders or from placing a cursor (e.g., arrow) over a image. The request at 910 then causes an execution engine associated with the browser (e.g., plugin) to retrieve the requested information at 920 from a source such as a web page. Furthermore, it should be noted that the execution engine can cause devices to execute processes to generate or retrieve particular data. At 930, upon receiving the requested information updates the browser. It should also be noted and appreciated that according to an aspect of the invention, this methodology can be completed in real-time such that a user would notice and any significant delay between an request causing action on their part and the information being retrieved and updated in the browser.

Figure 10:
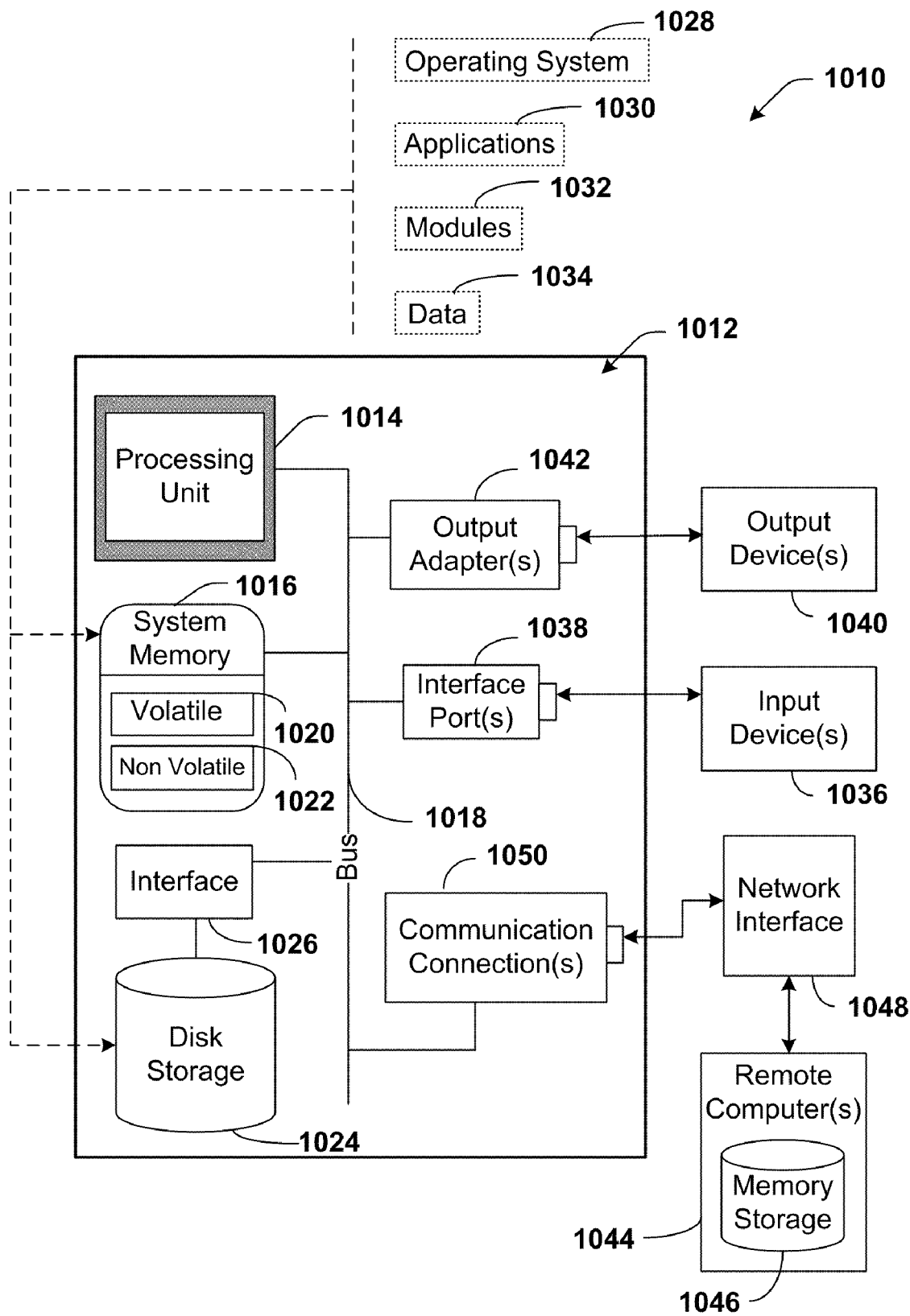
FIG. 10 is a schematic block diagram illustrating a suitable operating environment in accordance with an aspect of the present invention.
Figure 11:
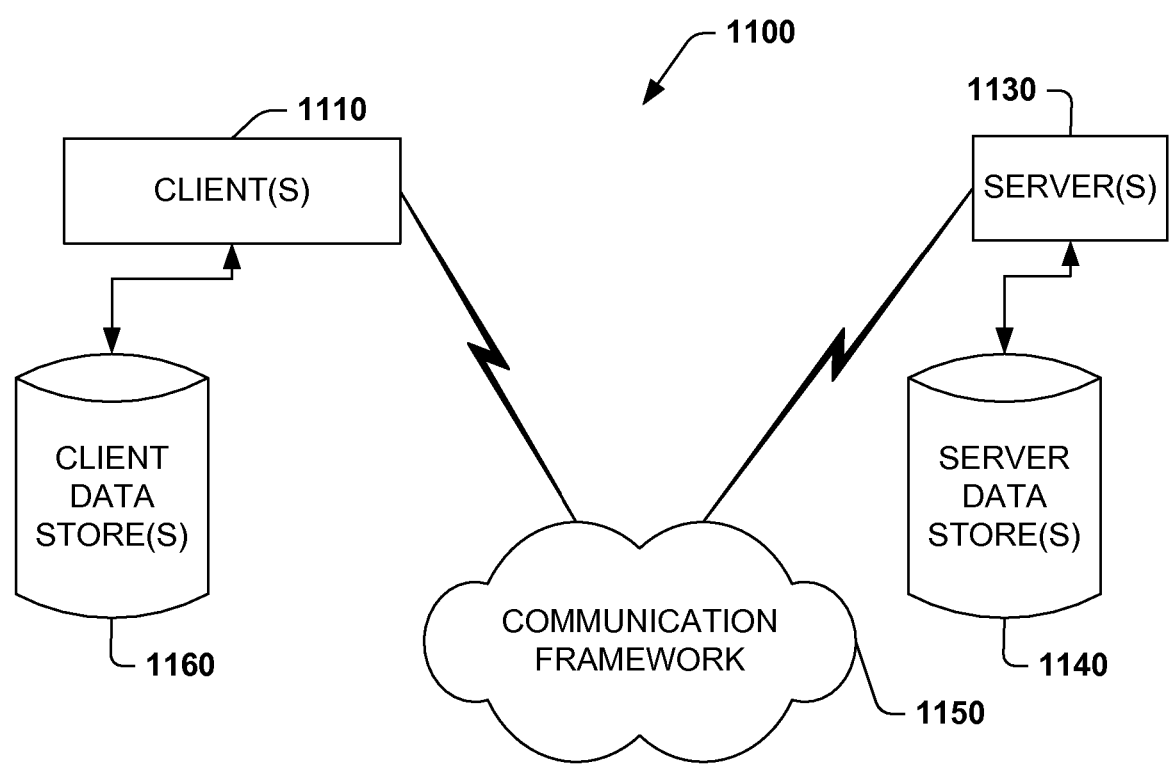
FIG. 11 is a schematic block diagram of a sample-computing environment with which the present invention can interact.

In order to provide a context for the various aspects of the invention, FIGS. 10 and 11 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practices on stand alone computers. In a distributed computing environment, program modules may be locate in both local and remote memory storage devices.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example disk storage 1024. Disk storage 4124 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 with which the present invention can interact. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the present invention, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A browser-based system for interacting with automation devices, comprising:
    an interactive program embedded within a web browser;
    a binding component that binds automation device data to variables within the interactive program;
    a presentation component that visualizes the automation device data in real-time on the web browser using interactive full motion video and that facilitates user interaction with the automation device data via the web browser.

2. The system of claim 1, wherein the presentation component utilizes a flash player to visualize the automation device data via the browser.

3. The system of claim 1, wherein the presentation component visualizes the automation device data as at least one of an interactive graph or an interactive chart.

4. The system of claim 3, wherein clicking and dragging points on the interactive graph writes modified production schedule values to at least one automation device corresponding to the graph.

5. The system of claim 1, wherein the interactive program employs functions that operate on the automation device data and renders the results of the operations using the presentation component.

6. The system of claim 5, wherein the functions compare automation device data values with optimal values provided by an equipment manufacturer via a web service, and generates an alert based on the comparison.

7. The system of claim 1, further comprising an execution engine supporting full motion video that executes the embedded interactive program.

8. The system of claim 7, wherein the execution engine is at least one of a flash player browser plugin or a shockwave player browser plugin.

9. The system of claim 1, wherein the presentation component visualizes the automation device data in an interactive multimedia format.

10. The system of claim 9, wherein the interactive multimedia format includes at least one of a button, a checkbox, a slide bar, a text box, or a hyperlink to facilitate interaction with the automation device data.

11. The system of claim 9, wherein hovering a cursor over a graphical depiction of an industrial device visualized by the presentation component causes data associated with the industrial device to be retrieved from at least one automation device and displayed in the web browser.

12. A method for interacting with automation devices using a web browser, comprising:
    embedding an interactive program into a browser;
    binding program variables within the interactive program to device data in at least one automation device;
    executing the interactive program using an execution engine that supports full motion video; and
    generating an interactive full motion video representation of the device data within the browser using the interactive program and the execution engine.

13. The method of claim 12, wherein the execution engine is one of a flash player or a shockwave player.

14. The method of claim 12, further comprising rendering the device data as at least one of an interactive graph or an interactive chart within the full motion video representation.

15. The method of claim 12, further comprising updating the full motion video representation in real-time as the device data changes.

16. The method of claim 12, further comprising accepting user input via the interactive full motion video representation to facilitate interaction with the at least one automation device.

17. The method of claim 12, further comprising performing an operation on the device data using functions within the interactive program and displaying the result of the operation on the browser.

18. The method of claim 12, further comprising:
    positioning a cursor over an image on the full motion video representation;
    retrieving information regarding an automation device represented by the image in response to positioning the cursor over the image; and
    rendering the retrieved information on the browser.

19. A human-machine interface apparatus for use in an industrial control environment, comprising:
    a browser;
    an interactive program embedded within the browser that retrieves device data from at least one automation device for rendering on the browser; and
    an execution engine plugin for the browser that executes the interactive program within the browser to facilitate visualizing the device data using full motion video.

20. The apparatus of claim 19, wherein the execution engine is one of a flash player or a shockwave player.

* * * * *